(12) United States Patent
Grebenyuk et al.

(10) Patent No.: US 8,524,062 B2
(45) Date of Patent: Sep. 3, 2013

(54) ELECTRODEIONIZATION DEVICE AND METHOD WITH IMPROVED SCALING RESISTANCE

(75) Inventors: Oleg Grebenyuk, Sherborn, MA (US); Vladimir Grebenyuk, Woburn, MA (US); Li Zhang, Belmont, MA (US); Keith J. Sims, Wayland, MA (US); John Barber, Fergus (CA)

(73) Assignee: General Electric Company, Schenectady, NY (US)

( * ) Notice: Subject to any disclaimer, the term of this patent is extended or adjusted under 35 U.S.C. 154(b) by 217 days.

(21) Appl. No.: 12/980,506

(22) Filed: Dec. 29, 2010

(65) Prior Publication Data
US 2012/0168313 A1 Jul. 5, 2012

(51) Int. Cl.
*B01D 61/48* (2006.01)

(52) U.S. Cl.
USPC .......................................... 204/632

(58) Field of Classification Search
USPC .......................................... 204/632
See application file for complete search history.

(56) References Cited

U.S. PATENT DOCUMENTS

| | | | |
|---|---|---|---|
| 4,956,071 A | 9/1990 | Giuffrida et al. | |
| 5,593,563 A * | 1/1997 | Denoncourt et al. | 204/524 |
| 5,837,124 A | 11/1998 | Su et al. | |
| 5,961,805 A | 10/1999 | Terada et al. | |
| 6,056,878 A | 5/2000 | Tessier et al. | |
| 6,123,823 A * | 9/2000 | Mani | 204/632 |

(Continued)

FOREIGN PATENT DOCUMENTS

| | | |
|---|---|---|
| EP | 1 075 868 A2 | 2/2001 |
| EP | 1075868 A2 | 2/2001 |
| WO | 2005011849 A2 | 2/2005 |
| WO | WO 2005/011849 A2 | 2/2005 |

OTHER PUBLICATIONS

Search Report and Written Opinion from corresponding PCT Application No. PCT/US2011/063631 dated Feb. 23, 2012.

(Continued)

*Primary Examiner* — Arun S Phasge
(74) *Attorney, Agent, or Firm* — Wegman, Hessler & Vanderburg

(57) ABSTRACT

An electrodeionization apparatus includes an anode compartment provided with an anode and a cathode compartment spaced from the anode compartment and provided with a cathode, wherein the anode and cathode are configured for coupling to a DC power source to effect an electric potential difference between the anode and the cathode and thereby influence transport of ionic material in liquid media and ion exchange media by the influence of the electric potential difference. The electrodeionization apparatus also includes a feed inlet receiving a feed solution, a product water outlet and a plurality of anion exchange membranes and a plurality of cation exchange membranes alternately arranged between the anode compartment and the cathode compartment. The electrodeionization apparatus also includes a plurality of spacers, wherein the spacers and the anion and cation exchange membranes are arranged to form a first diluting compartment receiving feed solution from the feed inlet, a second diluting compartment in series with the first diluting compartment and delivering product water to the product water outlet, a first concentrating compartment and a second concentrating compartment. The first and second diluting compartments are bounded by an anion exchange membrane on the side closest to the anode and by a cation exchange membrane on the side closest to the cathode. The first and second concentrating compartments are bounded by a cation exchange membrane on the side closest to the anode and by an anion exchange membrane on the side closest to the cathode.

9 Claims, 3 Drawing Sheets

(56) References Cited

U.S. PATENT DOCUMENTS

| | | | |
|---|---|---|---|
| 6,149,788 A | 11/2000 | Tessier et al. | |
| 6,187,162 B1 | 2/2001 | Mir | |
| 6,296,751 B1 | 10/2001 | Mir | |
| 6,365,023 B1 | 4/2002 | De Los Reyes et al. | |
| 6,379,518 B1 | 4/2002 | Osawa et al. | |
| 6,398,965 B1 | 6/2002 | Arba et al. | |
| 6,402,917 B1 | 6/2002 | Emery et al. | |
| 6,436,261 B1 | 8/2002 | Sato et al. | |
| 6,471,867 B2 | 10/2002 | Sugaya et al. | |
| 6,565,725 B2 | 5/2003 | Sugaya et al. | |
| 6,565,726 B2 | 5/2003 | Sato | |
| 6,733,646 B2 | 5/2004 | Sato et al. | |
| 6,896,814 B2 | 5/2005 | Chidambaran et al. | |
| 7,033,472 B2 | 4/2006 | Yamanaka et al. | |
| 7,591,933 B2 | 9/2009 | Grebenyuk et al. | |
| 2003/0201235 A1 | 10/2003 | Chidambaran et al. | |
| 2003/0213695 A1* | 11/2003 | Yamanaka et al. | 204/632 |
| 2006/0163056 A1 | 7/2006 | Grebenyuk et al. | |
| 2008/0073215 A1 | 3/2008 | Barber et al. | |
| 2008/0105552 A1 | 5/2008 | Li et al. | |
| 2008/0295581 A1 | 12/2008 | Zhang et al. | |
| 2010/0242995 A1 | 9/2010 | Xiong et al. | |

OTHER PUBLICATIONS

International Search Report and Written Opinion mailed Feb. 23, 2012 for PCT/US2011/063631 filed Dec. 7, 2011.

* cited by examiner

ELECTRODEIONIZATION DEVICE AND METHOD WITH IMPROVED SCALING RESISTANCE

BACKGROUND OF THE INVENTION

1. Field of the Invention

The invention relates to apparatus and methods for carrying out electrodeionization to purify water, and more particularly to an electrodeionization device and method with improved scaling resistance.

2. Description of Related Art

Electrodeionization (EDI) is a membrane separation deionization technique that combines the techniques of electodialysis and ion exchange. EDI purification apparatus has many advantages, such as, producing water continuously, regenerating ion exchange resins without using alkalis and acids, automatically operating, etc. It has become a standard alternative to mixed bed as the final water treatment apparatus used in pure water preparation systems. A plate and frame type EDI apparatus includes an anode, a cathode, anion-permeable membranes and cation-permeable membranes. The membranes are arranged alternately in such a manner as to alternately form concentrating compartments and desalting compartments (dilution compartments) in a stack between the anode and the cathode. The desalting compartments are filled with an ion exchanger such as an ion exchange resin beads. The liquid being treated in the diluting compartments is depleted of ions while the liquid in the concentrating compartments becomes enriched with the transferred ions through their respective membrane and carries them in concentrated form.

The cations and anions ions in the feed water to the EDI apparatus can perform ion exchange with the $H^+$ and $OH^-$ in the cation and anion exchange resins respectively, and therefore are ionically attach to the resin particles. The ions migrate under the influence of electric field through the ion-flow passage formed by resin particles. This is because that in the application systems of EDI, the electric conductivity of the resin is several magnitudes higher than that of the water solution. The ions migrate into the concentrate chamber through the ion exchange membranes, and hence complete the process of water deionization. Under a certain potential drop, the water is decomposed into $H^+$ and $OH^-$ due to the assisted water dissociation at the interface of the two different types of resins and membranes and the resin is therefore regenerated.

The diluting compartments are filled with porous ion exchanging solid materials producing voids between the particles through which the water to be deionized flows. The ion exchanging materials are commonly mixtures of cation exchanging resins and anion exchanging resins or woven and non-woven fibers. An assembly of one or more pairs of diluting and concentrating compartments, referred to as a "cell pair", is bounded on either side by an anode and a cathode which typically apply an electric field perpendicular to the general direction of liquid flow. However, in other configurations, the current and liquid flow in the same or opposite directions. The applied electric field causes anions to move from the diluting compartment across the anion exchange membrane into the concentrating compartment nearer the anode and cations to move from the diluting compartment across the cation exchange membrane into the concentrating compartment nearer the cathode. The anions and cations become trapped in the concentrating compartments because the movement of anions toward the anode is blocked by a cation exchange membrane, and the movement of cations toward the cathode is blocked by an anion exchange membrane. A flow of water is set up to remove the ions from the concentrating compartments. The net result of the process is the removal of ions from the water stream flowing through the diluting compartments and their concentration in the water flowing through the concentrating compartments.

Typically, the EDI feed water is initially pretreated in a reverse osmosis step to reduce the ionic load and colloidal contaminants therein, prior to being directed towards electrodeionization. This practice extends the useful life of the resin beads used in electrodeionization. However, even when using a reverse osmosis pretreating step, the concentration of calcium and/or magnesium cations and sulfate and/or carbonate anions can cause so-called "scaling" in the concentration compartments due to precipitation. The consequence of this scaling is restricted concentrate flow, an increase in stack electrical resistance, a drop in current density and eventually a sharp decrease in the purity of the product water. This negatively affects performance characteristics by increasing operating cost, decreasing product water quality, or making the EDI stack inoperable.

It is desired to have an electrodeionization device and method with improved scaling resistance.

SUMMARY OF THE INVENTION

In one aspect, the invention is directed to an electrodeionization apparatus. The electrodeionization apparatus includes an anode compartment provided with an anode and a cathode compartment spaced from the anode compartment and provided with a cathode, wherein the anode and cathode are configured for coupling to a DC power source to effect an electric potential difference between the anode and the cathode and thereby influence transport of ionic material in liquid media and ion exchange media by the influence of the electric potential difference. The electrodeionization apparatus also includes a feed inlet receiving a feed solution, a product water outlet and a plurality of anion exchange membranes and a plurality of cation exchange membranes alternately arranged between the anode compartment and the cathode compartment. The electrodeionization apparatus also includes a plurality of spacers, wherein the spacers and the anion and cation exchange membranes are arranged to form a first diluting compartment receiving feed solution from the feed inlet, a second diluting compartment in series with the first diluting compartment and delivering product water to the product water outlet, a first concentrating compartment and a second concentrating compartment. The first and second diluting compartments are bounded by an anion exchange membrane on the side closest to the anode and by a cation exchange membrane on the side closest to the cathode. The first and second concentrating compartments are bounded by a cation exchange membrane on the side closest to the anode and by an anion exchange membrane on the side closest to the cathode.

In another aspect, the spacers and the anion and cation exchange membranes together form an electrodeionization group. The electrodeionization apparatus includes a plurality of repeating electrodeionization groups assembled together as a stack.

The present invention and its advantages over the prior art will become apparent upon reading the following detailed description and the appended claims with reference to the accompanying drawings.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF THE INVENTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications, and equivalents as will become apparent from consideration of the following detailed description.

Figure 1:
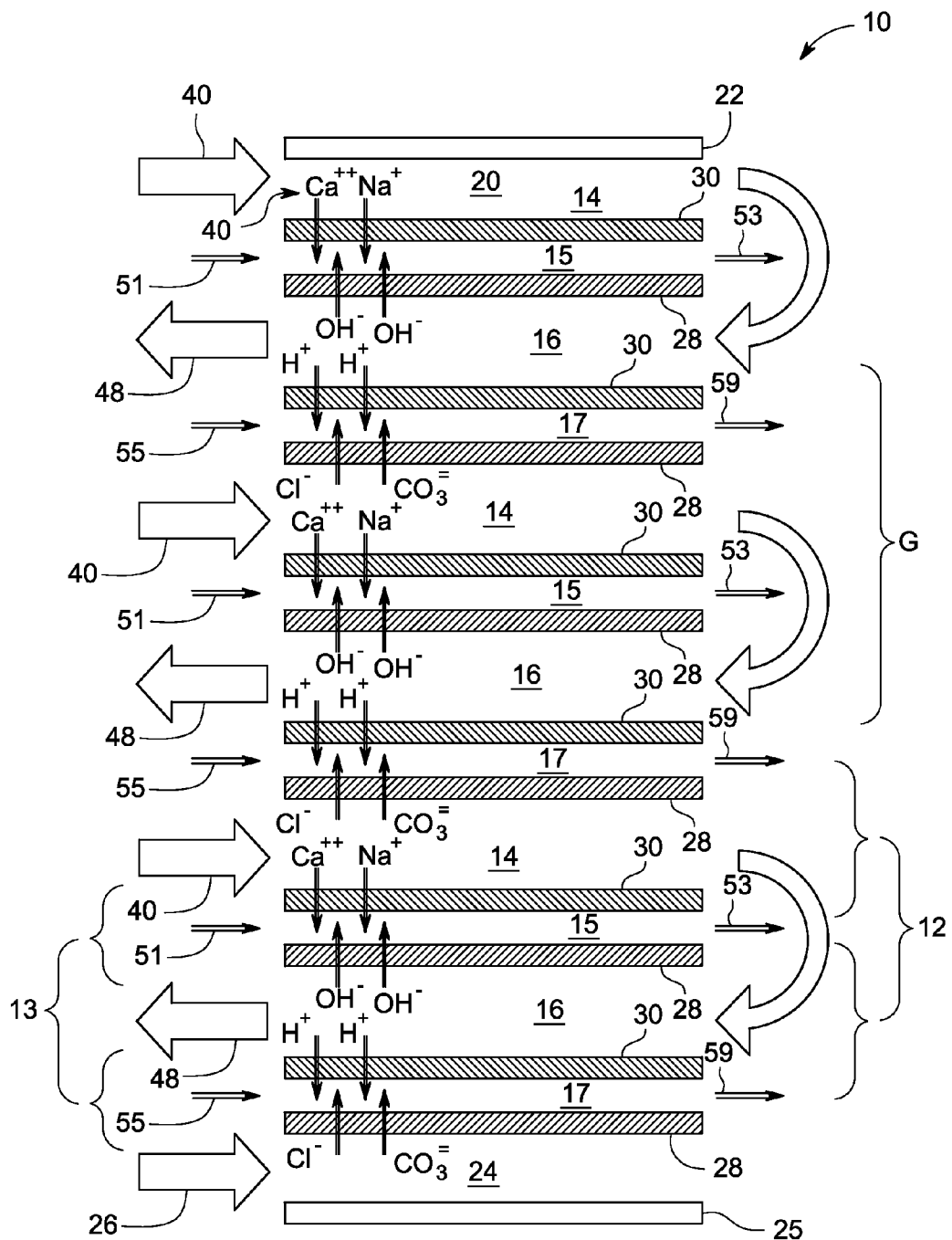
FIG. 1 illustrates a schematic view of a system for reducing recalcitrant organic pollutants according to an embodiment of the invention.

Referring to FIG. 1, there is shown an electrodeionization apparatus 10 having a plurality of diluting chambers 12 and a plurality of concentrating chambers 13 as will be further described below which have both anion exchange resin and cation exchange resin contained therein. According to the invention, each diluting chamber 12 comprises into a first diluting compartment 14 and a second diluting compartment 16. Each concentrating chamber 13 is divided into a first concentrating compartment 15 and a second concentrating compartment 17. As seen in FIG. 1, the electrodeionization apparatus 10 is made of repeating groups G of components comprising first and second diluting compartments 14, 16 and first and second concentrating compartments 15, 17.

The electrodeionization apparatus 10 includes an anode compartment 20 provided with an anode 22, and a cathode compartment 24 spaced from the anode compartment and provided with a cathode 25. Each of the compartments 20, 24 is configured to receive a flow of electrolytic material 26, such as feed water or an aqueous solution. The anode 22 and cathode 25 are configured for coupling to a DC power source to effect an electric potential difference between the anode 22 and the cathode 25 and thereby influence transport of ionic material in liquid media and ion exchange media by the influence of the electric potential difference. As the anode compartment 20 and/or the cathode compartment 24 may, in some embodiments, be disposed adjacent to a concentrating chamber 13, the compartments 20 and 24 may also be considered to be diluting chambers 12.

In an embodiment in which the anode compartment 20 and/or the cathode compartment 24 is considered a diluting chamber 12, the anode compartment 20 and/or the cathode compartment 24 is configured to receive feed solution 40. In an embodiment in which the anode compartment 20 and/or the cathode compartment 24 is considered a concentrating chamber 13, the anode compartment 20 and/or the cathode compartment 24 is configured to receive first concentrating solution 51 or second concentrating solution 55.

In FIG. 1, the anode compartment 20 is configured as a diluting chamber 12 and receives feed solution 40. However, cathode compartment 24, which is not configured as either a diluting chamber 12 or a concentrating chamber 13, receives a flow of electrolytic material 26.

A plurality of anion exchange membranes 28 and cation exchange membranes 30 are alternately arranged between the anode compartment 20 and the cathode compartment 24 to form the first and second diluting compartments 14, 16 and the first and second concentrating compartments 15, 17. As used herein, the term "anion exchange membrane" means a membrane which is configured to preferentially permit the transport of anions over that of cations from the first and second diluting compartments 14, 16 to the first and second concentrating compartments 15, 17 and the term "cation exchange membrane" means a membrane which is configured to preferentially permit the transport of cations over that of anions from the first and second diluting compartments 14, 16 to the first and second concentrating compartments 15, 17 during operation of the electrodeionization apparatus 10. The illustrated ion fluxes across the membranes 28, 30 in FIG. 1 is limited to Sodium, Calcium, Hydrogen, Hydroxide, Chloride, and Carbonate ions for the purpose of simplicity. One skilled in the art will understand that other ions would be transferred in a similar manner.

Each of the first and second diluting compartments 14, 16 are bounded by an anion exchange membrane 28 on the anode side (i.e., the side closest to the anode 22) and by a cation exchange membrane 30 on the cathode side (i.e., the side closest to the cathode 25). Each of the first and second concentrating compartments 15, 17 are bounded by a cation exchange membrane 30 on the anode side and by an anion exchange membrane 28 on the cathode side. The anion exchange membranes 28 are configured to permit preferential transport of anions into the concentrating compartments 15, 17. The cation exchange membranes 30 are configured to permit preferential transport of cations into the concentrating compartments 15, 17. FIG. 1 shows the electrodeionization apparatus 10 with three repeating groups G. One skilled in the art will understand that the number of repeating groups may be more or less without departing from the scope of the invention.

The components shown on FIG. 1 are assembled together as a stack between pressure plates (not show) held together by bolts or a hydraulic ram or in a housing that contains the components and provides manifolds to direct the incoming liquid to and the outgoing liquid from diluting compartments 14, 16 and concentrating compartments 15, 17. Diluting compartments 14, 16 and concentrating compartments 15, 17 are typically between about 1.0 mm and 10.0 mm thick, and there typically are about 10 to 300 diluting compartments in apparatus 10. The surface area of each exchange membrane 28, 30 is typically between about 0.5 (0.0465 $m^2$) and 5.0 square feet (0.465 $m^2$).

A feed solution 40 (typically the product water output of an RO apparatus) enters inlet 42 of the first diluting compartment 14. The first diluting compartment is separated by the cation exchange membrane 30 from the first concentrate compartment 15 and by the anion exchange membrane 28 from the second concentrate compartment 17. Desirably, a major portion of ionic contaminants present in the feed solution 40 is transferred to the adjacent first and second concentrating compartments 15, 17 during the path through the first diluting compartment 14. Thus, most of cations would be transferred to the first concentrate compartment 15 and most of the anions would be transported to the second concentrate compartment 17.

In one embodiment, the thickness of the first diluting compartment 14 is greater than the thickness of the second diluting compartment 16. In another embodiment, the thickness of the first diluting compartment 14 is about two to four times greater than the thickness of the second diluting compartment 16. In an additional embodiment, the thickness of the first diluting compartment 14 is about four to eight times greater than the thickness of the second diluting compartment 16.

Further, in another embodiment, the thickness of the first diluting compartment 14 is less than the thickness of the second diluting compartment 16. In another embodiment, the thickness of the first diluting compartment 14 is about two to four times less than the thickness of the second diluting compartment 16. In an additional embodiment, the thickness of the first diluting compartment 14 is about four to eight times less than the thickness of the second diluting compartment 16.

After passing through the first diluting compartment 14, the feed solution enters the second diluting compartment 16. During this stage, remaining trace contaminants are removed. The predominant ions crossing through the adjacent anion exchange and cation exchange membranes 28, 30 from the second diluting compartment 16 are hydrogen and hydroxide ions produced from water splitting. More particularly, in the interface between the ion exchange resins and the ion exchange resins and ion exchange membrane 28, 30, water is actively dissociated to form $H^+$ and $OH^-$. In such a case, part of the $H^+$ ions will permeate through the cation exchange membrane 30 into the second concentrate chamber 17 and part of $OH^-$ will permeate through the anion exchange membrane 28 into the first concentrate chamber 15. The surface of the concentrate chamber side of the cation exchange membrane 30 exhibits strong acidic, indicating the existence of local high $H^+$ concentration. As comparison, the surface of concentrate chamber side of the anion exchange membrane 28 exhibits strong alkaline, indicating the existence of high $OH^-$ concentration. As a result, the stream in the first concentrate compartment 15 carries a majority of cations and has a high pH, and the stream in the second concentrate compartment 17 carries a majority of anions and has a low pH. Cation/anion segregation provides reduced contact times between scaling cations and scaling anions so as to reduce the risk of calcium/magnesium carbonate/sulfate scale formation within the electrodeionization apparatus.

The feed solution 40 is purified in first and second diluting compartments 14, 16 and is discharged as a purified liquid flow through outlet 48. The first concentrating compartment 15 is configured to receive a first concentrating flow 51 of liquid, such as water or an aqueous solution, which accepts the ions that transport from adjacent first and second diluting compartments 14, 16, out of the first concentrating compartment 15. A liquid flow 53, which is concentrated in these ions, is discharged from the first concentrating compartment 17. The second concentrating compartment 17 is configured to receive a second concentrating flow 55 of liquid, such as water or an aqueous solution, which accepts the ions that transport from adjacent first and second diluting compartments 14, 16, out of the second concentrating compartment 17. A liquid flow 59, which is concentrated in these ions, is discharged from the second concentrating compartment 17. The liquid flowing through the first and second concentrating compartments 15, 17 can flow in a co-current or counter-current or cross-current direction, or other possible flow configurations, relative to the feed solution 40 liquid flowing through first and second diluting compartments 14, 16.

Figure 2:
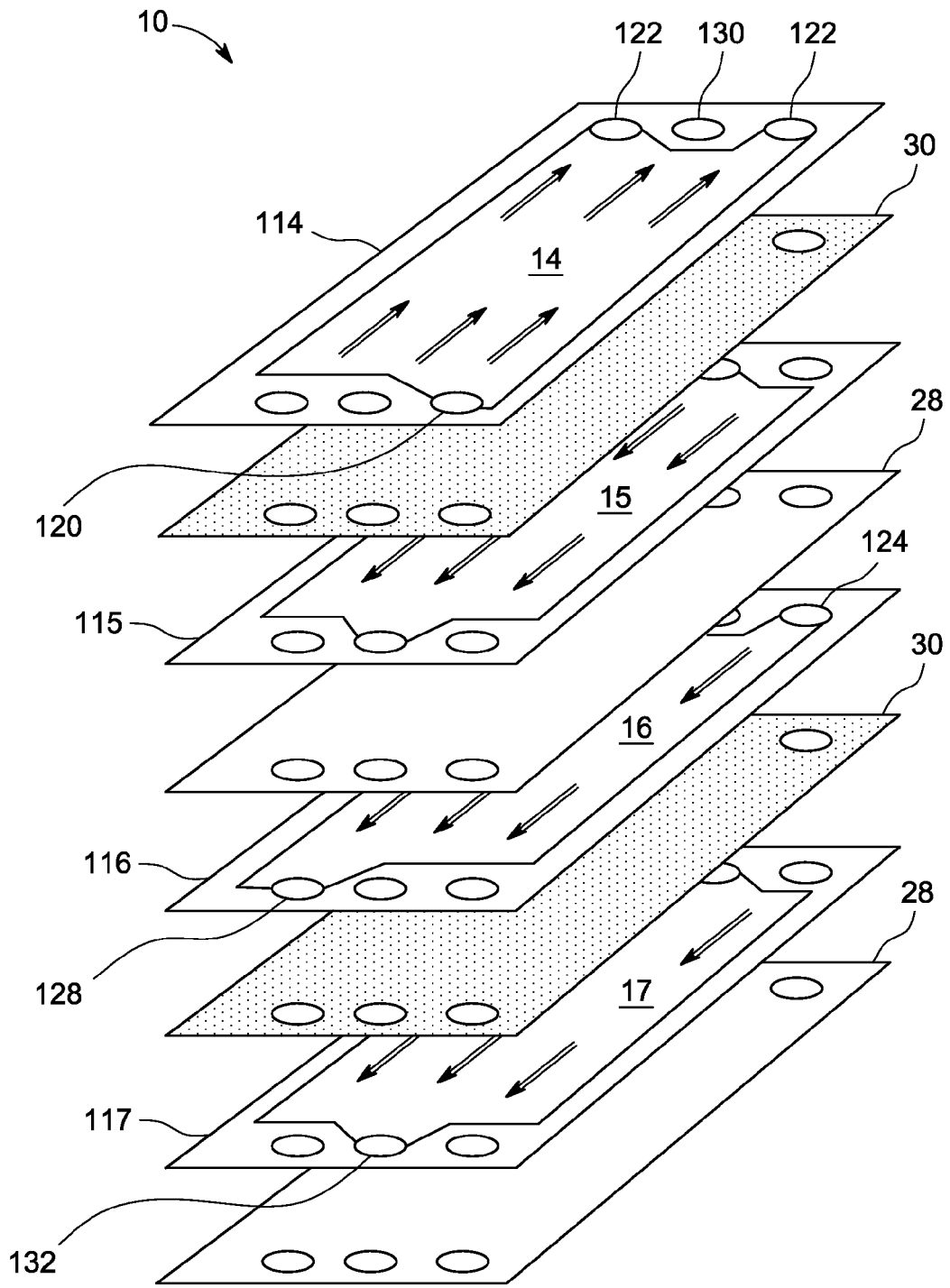
FIG. 2 illustrates a schematic view of a system for reducing recalcitrant organic pollutants according to an embodiment of the invention.

In the embodiment illustrated in FIG. 2, one repeating group G consists of a first diluting compartment spacer 114 and a second diluting compartment spacer 116 for diluting streams, a first concentrating compartment spacer 115 and a second concentrating compartment spacer 117 for concentrating streams, two cation-exchange membranes 30 and two anion exchange membranes 28. The spacers 114, 115, 116, 117 and membranes 28, 30 are placed in alternating manner. The anion and cation exchange membranes 28, 30 are substantially impermeable for liquid flow and separate streams in adjacent spacers. Each spacer has ports allowing entering and exiting of corresponding stream or providing isolated connection for other streams as will be described below.

The group G comprise of (from top to bottom) first diluting compartment 14, cation exchange membrane 30, first concentrate compartment 15, anion exchange membrane 28, second diluting compartment 16, cation exchange membrane 30, second concentrate compartment 17, and an anion exchange membrane 28. The feed solution 40 entering the first diluting compartment 14 through port 120 shown in the front-right corner of the first diluting compartment spacer 114 and exits through two ports 122 on the far corners of the first diluting compartment spacer. Arrows indicate the stream direction. The majority of cations present in the incoming feed solution are transferred through cation exchange membrane 30 to the concentrate stream in the first concentrate compartment 15. The exiting ports 122 of the first diluting compartment 14 are hydraulically connected with entrance ports 124 of the second diluting compartment 16. In the illustrated embodiment, the ports 124 are shown in the far corners of the second dilute compartment spacer 116 forming the second dilute compartment 16. Arrows show the flow direction in the second dilute compartment 16. The treated stream is exiting the second dilute compartment 16 through the port 128 shown in the close-left corner. First and second concentrating compartments 15, 17 have streams flowing in parallel through corresponding spacers 115, 117 as shown by flow arrows. The concentrating streams have common entry port 130 (far side, middle) and common exit port 132 (close side, middle).

The ports in the spacers, the spacer relative placement, and other necessary hydraulic connection allow the first and second dilute compartments 14, 16 to be connected in series and the first and second concentrated compartments 15, 17 to be connected in parallel all within each repeating group G of components. Desirably, the operating parameters of the electrodeionization apparatus 10 are chosen such that a substantial fraction of scale-forming ions in the feed solution 40 are transferred to the adjacent first and second concentrate compartments 15, 17 from the first dilute compartment 14.

One skilled in the art will understand that the stream in the first diluting compartment 14 can flow counter current or co-current to the stream in the second diluting compartment 16, the stream in the first concentrating compartment 15 can flow counter current or co-current to the stream in the first diluting compartment 14, the stream in the first concentrating compartment 15 can flow counter current or co-current to the stream in the second concentrating compartment 17. Additionally, the first concentrating compartment 14 and the second concentrating compartment 17 can be recombined at place, where electrically induced water splitting/recombination is absent or may be kept separately in the stack and evacuated through separate ports. First concentrate compartment 15 and second concentrate compartment 17 can be fed from the same source or can be fed from different sources. In one embodiment, concentrate flow (at least one of the two) is fed by dilute feed. It is also contemplated that concentrate flow (at least one of the two) is fed by dilute product water, or that concentrate flow (at least one of the two) is fed by intermediate product water obtained from between the first and second diluting compartments 14, 16. Alternately, concentrate flow (at least one of the two) may be fed by an independent source of low hardness/low inorganic carbon water.

Spacers 114, 115, 116, 117 are interposed between the alternating anion and cation exchange membranes 28, 20 so as to maintain spacing between opposing anion and cation exchange membranes 28, 20 and thereby provide compartments 14, 15, 16, 17 with respective flowpaths for liquid flow. Spacers 114, 115, 116, 117 may include a mesh, wherein the mesh is provided to maintain spacing between opposing membranes, or an opposing membrane and an end frame assembly, of the concentrating chambers of the electrodeionization apparatus 10, and thereby facilitate provision of a fluid flowpath within the concentrating compartments. It is understood that concentrating compartments containing ion exchange material do not necessarily require spacers with mesh, as the ion exchange material within the concentrating compartments facilitate the provision of a flowpath in the compartments. One such concentrate chamber ion exchange resin arrangement can be found in US20080073215A, herein incorporated by reference. Having said that, concentrating compartments whose construction includes spacers with mesh are not precluded from the scope of the invention. Accordingly, suitable spacers include spacers with or without a mesh.

Figure 3:
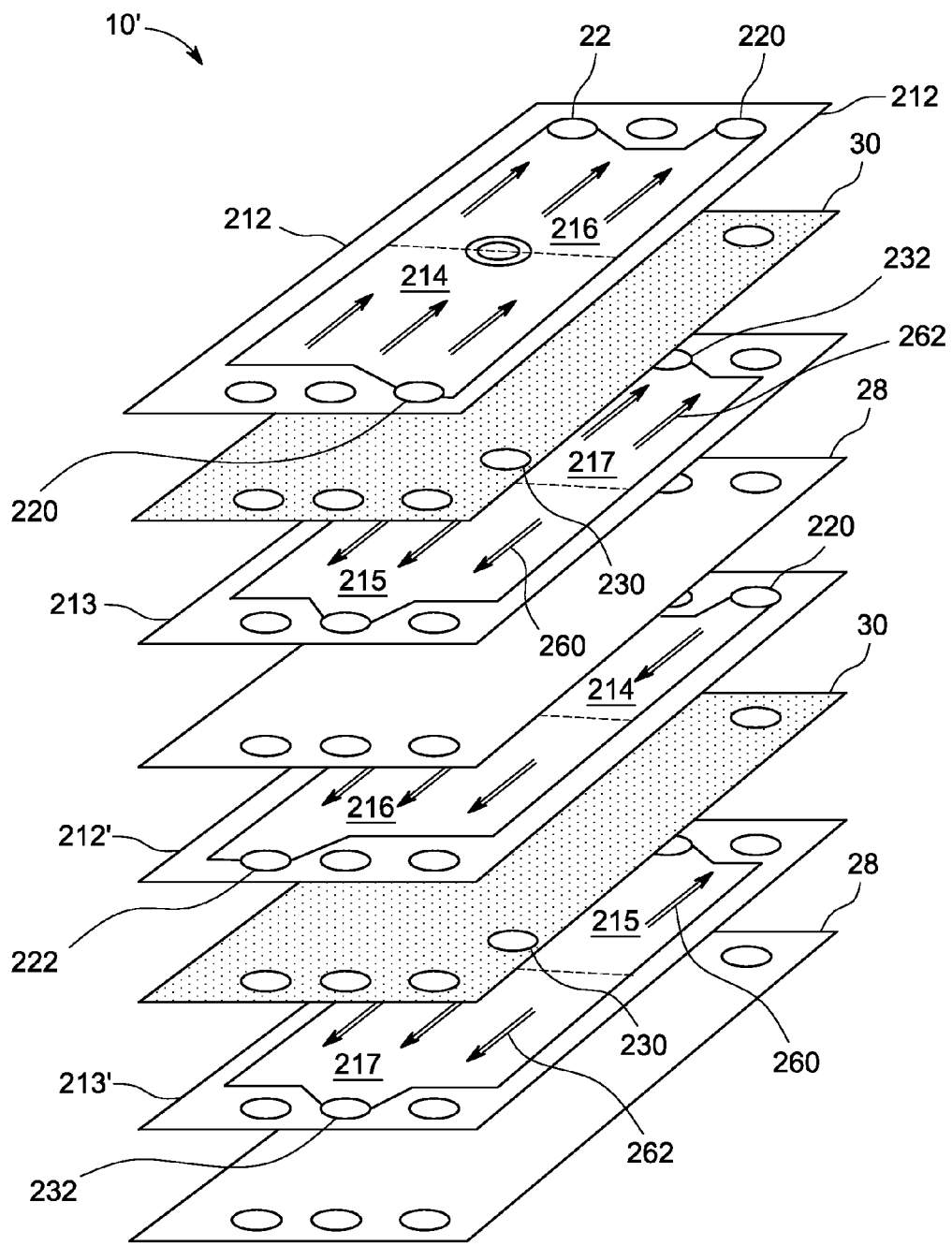
FIG. 3 illustrates a schematic view of a system for reducing recalcitrant organic pollutants according to an embodiment of the invention.

FIG. 3. illustrates another embodiment of electrodeionization apparatus 10'. FIG. 3 shows a single repeating group G of components; however, one skilled in the art will understand that more groups may be arranged as a stack in the apparatus 10'. A diluting compartment spacer 212 (top) has an entrance port 220 at close-right corner and exits though an exit port 222 in the far-left corner. The first half of this diluting compartment spacer 212 forms a first diluting compartment 214 that operates in a manner similar to operation of the first diluting compartment 14 described above. The second half of the diluting compartment spacer 212 forms a second diluting compartment 216 that is similar to second diluting compartment 16 in previous example.

A concentrate spacer 213 adjacent the diluting compartment spacer 212 has a concentrate entrance port 230 in the middle of the spacer 213 and the incoming concentrate stream splits in two flow directions. The concentrate compartment spacer 213 forms a first concentrating compartment 215 that receives a portion of the stream directed in a first direction as represented by flow arrows 260 and forms a second concentrating compartment 217 that receives a second portion of the stream directed in a second direction as represented by flow arrows 262. The flow 260 directed in the first direction is similar to the flow in the first concentrating compartment spacer 115 from FIG. 2. This flow would accept most of cations from dilute stream above it and mostly hydroxides from dilute flow below. The flow 262 directed in the second direction would be similar to the flow in the second concentrating compartment spacer 117 from FIG. 2. It would be collecting anions from dilute stream below and hydrogen ions from dilute stream above it. The two other spacers 212' and 213' in FIG. 3 accommodate flows similar to the flows in spacers 212 and 213, but directed in the opposite direction. The operation conditions desirably allows for transfer of a majority of scale-forming ions within a first diluting compartment 215.

Example of suitable ion permeable membranes 28, 30 include heterogeneous ion exchange membranes and homogeneous ion permeable membranes. Suitable heterogeneous ion permeable membranes include, for example, Membranes International CMI-7000S™ (a cation exchange membrane) and Membranes International AMI-7001S™ (an anion exchange membrane). Suitable homogeneous ion permeable membrane include, for example, GE Infrastructure Water and Process Technologies (formerly IONICS) CR67HMP™ (a cation exchange membrane) and GE Infrastructure Water and Process Technologies (formerly IONICS) A103QDP™ (an anion exchange membrane). Fixed ion exchange materials can be provided in strands of combined anion and cation exchange materials in woven fabric, nonwoven fabric (randomly oriented strands) or extruded netting. Fixed ion exchange materials could also be provided by open cell foam and by combined exchange particles. The strands used in the fabrics can also take a variety of forms. The strands can be made in the form of a bundle of multiple filaments, in the form of braided strands, and in the form of a combined exchange particle filament, which is made of cation exchange particles and anion exchange particles that are held together by binder. The open cell foam includes cation exchange particles, anion exchange particles and binder and has an interconnected network of flow passages herethrough. The combined ion exchange particles are made up of cation exchange particles, anion exchange particles and binder and are sufficiently large so as to cause an acceptably low pressure drop in the flow channels. In some embodiments the ion exchange materials are not mixed, but instead include only anion exchange materials or particles or cation exchange materials or particles in a channel between membranes or region in a channel between membranes. It is also possible to use packed ion exchange in the diluting and concentrating channels in which the ion exchange material is fixed in place by compression of the materials so as to limit the movement of the material in the device, see U.S. Pat. No. 5,961,805, herein incorporated by reference.

In one embodiment, ion exchange material is disposed within each of the diluting compartments 14, 16 and concentrating compartments 15, 17. For example, the ion exchange material is mixed ion exchange material. Examples of suitable forms of ion exchange materials include beads, irregular shaped particles, fibers, rods, fabrics, or porous monoliths. The ion exchange materials may include both natural and synthetic materials.

As used herein, the term "anion exchange material" means material which is preferentially conductive to anionic species. In this respect, such material is configured to selectively exchange anionic species present in the material for anionic species from surrounding liquid and facilitate migration of the exchanged anionic species under an applied electric field. Examples of suitable anion exchange material include synthetic poly-styrenic beads cross-linked with divinyl benzene, such beads being functionalized with trimethylammonium or dimethylethanolammonium groups (e.g., Mitsubishi DIAION SA10A™ or Mitsubishi DIAION SA20A™). As used herein, the term "cation exchange material" means material which is preferentially conductive to cationic species. In this respect, such material is configured to selectively exchange cationic species present in the material for cationic species from surrounding liquid and facilitate migration of the exchanged cationic species under an applied electric field. Examples of suitable cation exchange material include synthetic poly-styrenic beads cross-linked with divinyl benzene, such beads being functionalized with sulphonic acid groups (e.g., Mitsubishi DIAION SK-1B™).

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the scope of the disclosure as defined by the following claims.

What is claimed is:

1. An electrodeionization apparatus comprising:
   an anode compartment provided with an anode;
   a cathode compartment spaced from the anode compartment and provided with a cathode, wherein the anode and cathode are configured for coupling to a DC power source to effect an electric potential difference between the anode and the cathode and thereby influence transport of ionic material in liquid media and ion exchange media by the influence of the electric potential difference;
   a feed inlet receiving a feed solution;
   a product water outlet;
   a plurality of anion exchange membranes and a plurality of cation exchange membranes alternately arranged between the anode compartment and the cathode compartment; and
   a plurality of spacers, wherein said spacers and said anion and cation exchange membranes are arranged to form a first diluting compartment receiving feed solution from the feed inlet, a second diluting compartment in series with the first diluting compartment and delivering product water to the product water outlet, a first concentrating compartment and a second concentrating compartment, in parallel with the first concentrating compartment wherein the first and second diluting compartments are bounded by an anion exchange membrane on the side closest to the anode and by a cation exchange membrane on the side closest to the cathode, and the first and second concentrating compartments are bounded by a cation exchange membrane on the side closest to the anode and by an anion exchange membrane on the side closest to the cathode;
   wherein said spacers which form first and second diluting compartments and first and second concentrating compartments and said anion and cation exchange membranes together form an electrodeionization group, the electrodeionization apparatus comprising a plurality of repeating electrodeionization groups assembled together as a stack;
   wherein the electrodeionization group comprises first and second diluting compartment spacers and first and second concentrating compartment spacers, wherein:
   a first of said diluting compartment spacers forms first and second diluting compartments, said first diluting compartment spacer having an entrance port at one end and an exit port at an opposite end, where a first portion of the first diluting compartment spacer forms a first diluting compartment receiving feed solution from its feed inlet and a second diluting compartment receiving feed solution from said first diluting compartment,
   a second of said diluting compartment spacers configured such that its entrance and exit ports are on opposite ends from that of the first diluting compartment spacer such that flow through the second diluting compartment is in the opposite direction compared to the flow in the first diluting compartment spacer, wherein said second diluting compartment spacer forms first and second diluting compartments configured in series; and
   each of said concentrating compartment spacers have an entrance port receiving concentrate stream in the middle of the concentrating spacer, the concentrating spacer directing incoming concentrate stream in two flow directions, wherein the concentrate compartment spacer forms the first and second concentrate compartments, wherein the first concentrating compartment receives a first portion of the concentrate stream directed in a first direction, and the second concentrating compartment receives a second portion of the stream directed in a second direction.

2. The electrodeionization apparatus of claim 1 wherein the electrodeionization group has first and second cation exchange membranes and first and second anion exchange membranes and is arranged with the first cation exchange membrane adjacent the first diluting spacer, the first concentrate compartment spacer adjacent the first cation exchange membrane, the first anion exchange membrane adjacent the first concentrate compartment spacer, the second diluting compartment spacer adjacent the first anion exchange membrane, the second cation exchange membrane adjacent the second diluting compartment spacer, the second concentrate compartment spacer adjacent the second cation exchange membrane, and the second anion exchange membrane adjacent the second concentrate compartment spacer.

3. The electrodeionization apparatus of claim 1 wherein the diluting compartments and concentrating compartments are between about 1.0 mm and 10.0 mm thick.

4. The electrodeionization apparatus of claim 1 wherein the thickness of said first diluting compartment is greater than the thickness of said second diluting compartment.

5. The electrodeionization apparatus of claim 4 wherein the thickness of said first diluting compartment is about two to four times greater than the thickness of said second diluting compartment.

6. The electrodeionization apparatus of claim 4 wherein the thickness of said first diluting compartment is about four to eight times greater than the thickness of said second diluting compartment.

7. The electrodeionization apparatus of claim 1 wherein the thickness of said first diluting compartment is less than the thickness of said second diluting compartment.

8. The electrodeionization apparatus of claim 7 wherein the thickness of said first diluting compartment is about two to four times less than the thickness of said second diluting compartment.

9. The electrodeionization apparatus of claim 7 wherein the thickness of said first diluting compartment is about four to eight times less than the thickness of said second diluting compartment.

* * * * *